United States Patent
Döner (10) Patent No.: US 11,337,041 B2
(45) Date of Patent: May 17, 2022

(54) METHODS AND APPARATUS FOR DISTRIBUTING PUBLISH-SUBSCRIBE MESSAGES

(71) Applicant: Vestel Elektronik Sanayi ve Ticaret A.S., Manisa (TR)

(72) Inventor: Çagdas Döner, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 16/626,176

(22) PCT Filed: Oct. 6, 2017

(86) PCT No.: PCT/EP2017/075483
§ 371 (c)(1),
(2) Date: Dec. 23, 2019

(87) PCT Pub. No.: WO2018/233855
PCT Pub. Date: Dec. 27, 2018

(65) Prior Publication Data
US 2020/0186973 A1    Jun. 11, 2020

(30) Foreign Application Priority Data
Jun. 23, 2017    (EP) .................................... 17177727

(51) Int. Cl.
*H04W 4/12*        (2009.01)
*H04L 101/622*     (2022.01)
*H04L 67/12*       (2022.01)
*H04L 67/55*       (2022.01)
*H04L 67/562*      (2022.01)

(52) U.S. Cl.
CPC ........... *H04W 4/12* (2013.01); *H04L 61/6022* (2013.01); *H04L 67/12* (2013.01); *H04L 67/26* (2013.01); *H04L 67/2809* (2013.01)

(58) Field of Classification Search
CPC .. H04W 4/12; H04L 67/2809; H04L 61/6022; H04L 67/12; H04L 67/26
(Continued)

(56) References Cited

U.S. PATENT DOCUMENTS 7,444,335 B1    10/2008 Colrain
2002/0129119 A1    9/2002 Aoki et al.
(Continued)

FOREIGN PATENT DOCUMENTS

JP    2007174127 A    7/2007
JP    2012003437 A    1/2012
(Continued)

OTHER PUBLICATIONS

English machine translation of JP 2007174127 A published on Jul. 5, 2007.
(Continued)

*Primary Examiner* — Congvan Tran
(74) *Attorney, Agent, or Firm* — Brandon V. Zuniga; James R. Gourley; Carstens & Cahoon, LLP (57) ABSTRACT

A method and apparatus for distributing publish-subscribe messages to clients over a network using a message broker. A first client is configured to send a message to the message broker to declare a second client as its successor. The message broker is configured to, when the first client disconnects from the message broker, route to the second client one or more messages that are indicated for delivery to the first client. The second client may then receive and process these messages in place of the first client.

13 Claims, 8 Drawing Sheets

(58) Field of Classification Search
USPC .......................................................... 370/312
See application file for complete search history.

(56) References Cited

U.S. PATENT DOCUMENTS

| | | |
|---|---|---|
| 2006/0047666 A1 | 3/2006 | Bedi |
| 2007/0213042 A1* | 9/2007 | Amiens ................... H04L 67/10 |
| | | 455/420 |
| 2008/0127209 A1* | 5/2008 | Gale ........................ G06F 9/546 |
| | | 719/313 |
| 2009/0019124 A1* | 1/2009 | Reynolds ................ H04L 67/10 |
| | | 709/206 |
| 2009/0172117 A1* | 7/2009 | Bedi ................. H04W 52/0229 |
| | | 709/206 |
| 2010/0281154 A1 | 11/2010 | Bedi et al. |
| 2015/0281374 A1 | 10/2015 | Petersen |
| 2018/0191663 A1* | 7/2018 | Harpaz ................... H04L 51/32 |
| 2018/0213378 A1* | 7/2018 | Brown .................... H04L 67/12 |

FOREIGN PATENT DOCUMENTS

| | | |
|---|---|---|
| WO | 02/21276 A1 | 3/2002 |
| WO | 2016/014516 A1 | 1/2016 |

OTHER PUBLICATIONS

English machine translation of JP 2012003437 A published on Jan. 5, 2012.

* cited by examiner

METHODS AND APPARATUS FOR DISTRIBUTING PUBLISH-SUBSCRIBE MESSAGES

CROSS-REFERENCE TO RELATED APPLICATIONS

This application is a US 371 Application from PCT/EP2017/075483 filed on Oct. 6, 2017, which claims priority to EP Application 17177727.9 filed on Jun. 23, 2017, the technical disclosures of which are hereby incorporated herein by reference.

TECHNICAL FIELD

The present disclosure relates to methods and apparatus for distributing publish-subscribe messages to clients over a network using a message broker.

BACKGROUND

A communication system can be seen as a facility that enables communication between two or more devices, such as user equipment, machine-like terminals, servers, or other nodes, by providing communication channels for carrying information between the two or more devices. A communication system can be provided for example by means of a communication network and one or more compatible communication devices. The communication may comprise, for example, communication of data for carrying data for voice, electronic mail (email), text message, multimedia and/or content data communications and so on.

One particular model that can be implemented for exchanging messages between devices is the publish-subscribe pattern.

SUMMARY

According to a first aspect, there is provided a method for distributing publish-subscribe messages to clients over a network using a message broker, the method comprising: the message broker, receiving a message from a first client which identifies a second client as a successor of the first client; determining that the first client has disconnected from the message broker; and in response to determining that the first client has disconnected from the message broker, the message broker routing to the second client one or more messages that are identified for transmission to the first client.

In some examples, the determining that the first client has disconnected from the message broker comprises determining that the first client has ungracefully disconnected from the message broker.

In some examples, the one or more messages are Message Queue Telemetry Transport messages.

In some examples, the method comprises prior to receiving the message from the first client identifying the second client: receiving a message from the second client indicating the availability of the second client for receiving messages identified for transmission to other clients; and sending to the first client an indication of the availability of the second client for receiving the one or more messages intended for transmission to the first client.

In some examples, the message from the second client comprises a vendor ID for the second client, and the sending to the first client the indication of the availability of the second client is performed in response to determining that the vendor ID of the second client matches a vendor ID of the first client.

In some examples, the method comprises: sending to the first client the indication of the availability of the second client in response to receiving a polling message from the first client to poll one or more clients to determine their availability for receiving the one or more messages intended for transmission to the first client.

In some examples, the one or more messages are identified as being for transmission to the first client by an indication of a subscription by the first client to a class of the one or more messages, wherein the indication is stored by the message broker.

In some examples, the message from a first client identifying a second client comprises a media access control address of the second client.

According to a second aspect, there is provided a method for controlling the distribution of publish-subscribe messages to clients, the method comprising: a first client sending a message to a message broker identifying a second client as a successor to the first client, the message comprising an instruction to the message broker to route to the second client one or more messages identified for transmission to the first client in response to the message broker determining that the first client has disconnected from the message broker.

According to a third aspect, there is provided a computer program comprising instructions such that when the computer program is executed on a computing device, the computing device is arranged to perform the steps of the first or second aspect.

According to a fourth aspect, there is provided a message broker configured to distribute publish-subscribe messages to clients, the message broker comprising at least one processor and at least one memory including computer program code, the at least one memory and the computer program code configured to, with the at least one processor, cause the message broker at least to: determine that a first client of the message broker has disconnected from the message broker; and in response to determining that the first client has disconnected from the message broker, route to a second client one or more messages that are identified for transmission to the first client, the second client having been identified in a message from the first client which identified the second client as a successor to the first client.

According to a fifth aspect, there is provided a first client device configured to control the distribution of publish-subscribe messages to clients, the first device comprising at least one processor and at least one memory including computer program code, the at least one memory and the computer program code configured to, with the at least one processor, cause the first client device at least to: send a message to a message broker identifying a second client as a successor to the first client, the message comprising an instruction to the message broker to route to the second client one or more messages identified for transmission to the first client in response to the message broker determining that the first client has disconnected from the message broker.

BRIEF DESCRIPTION OF THE DRAWINGS

To assist understanding of the present disclosure and to show how examples may be put into effect, reference is made by way of example to the accompanying drawings in which.

DETAILED DESCRIPTION

In the present specification, for convenience and by convention, reference will be made to "clients", "publishers", "subscribers", "message broker", etc., it being understood that, unless the context requires otherwise, this is to be taken to mean "client devices", "publisher devices", "subscriber devices", "message broker device", etc.

As mentioned earlier, one particular model that can be implemented for exchanging messages between devices is the so-called publish-subscribe pattern. In this, a client that is sending a message does not do so by programming the messages to be sent directly to specific receivers, as is common in many communication systems. Instead, when a client, known as a publisher, sends a message, it programs the message to be sent with an indication of a particular "class" (or "topic") to which the message belongs. The message is sent by the publisher to a message broker, which includes a list of all of the clients, known as subscribers, that have registered a subscription to the particular class of the message sent by the publisher. The message broker then sends the message to the subscribers indicated for that class. To register a subscription for a particular class of messages, a client may send a subscription message to the message broker, which will then store an indication that the client is subscribed to receive messages of that class, and forward any future messages to the client that are received from the publisher.

One protocol that is frequently used for publish-subscribe based messaging is the Message Queuing Telemetry Transport (MQTT) protocol, which is a lightweight messaging protocol for use on top of the TCP/IP protocol. MQTT is designed particularly for constrained devices and low-bandwidth, high-latency or unreliable networks. The design principles are to minimise network bandwidth and device resource requirements whilst also attempting to ensure reliability and some degree of assurance of delivery. These principles also turn out to make the protocol ideal for the emerging "machine-to-machine" (M2M) or "Internet of Things" world of connected devices, and for mobile applications where bandwidth and battery power are at a premium.

In general, as used herein, an IoT device is a device that has an addressable interface (e.g. an Internet protocol (IP) address, a Bluetooth identifier (ID), a near-field communication (NFC) ID, etc.) and can transmit information to one or more other devices over a wired or wireless connection. IoT devices may in general include or be incorporated in for example refrigerators, ovens, microwaves, freezers, dishwashers, clothes washing machines, clothes dryers, furnaces, air conditioners, thermostats, televisions and other consumer electronic devices, light fixtures, vacuum cleaners, sprinklers, electricity meters, gas meters, etc. IoT devices may be deployed in locations or situations where there is no mains powers supply or the IoT device may not suitable for a mains power supply, including in for example the case that the IoT device is a sensor for temperature, humidity, pressure, light levels, pollution levels, etc.

In some cases in a publish-subscribe system, clients may ungracefully disconnect from a message broker. However, the message broker may still receive messages of a class to which the ungracefully disconnected client is subscribed. The message broker could simply discard these messages intended for the client. However, they will then go unprocessed.

Before explaining in detail the examples, certain general principles of a publish subscribe communication system and suitable communication devices are briefly explained with reference to FIGS. 1 and 2 to assist in understanding the technology underlying the described examples.

Figure 1:
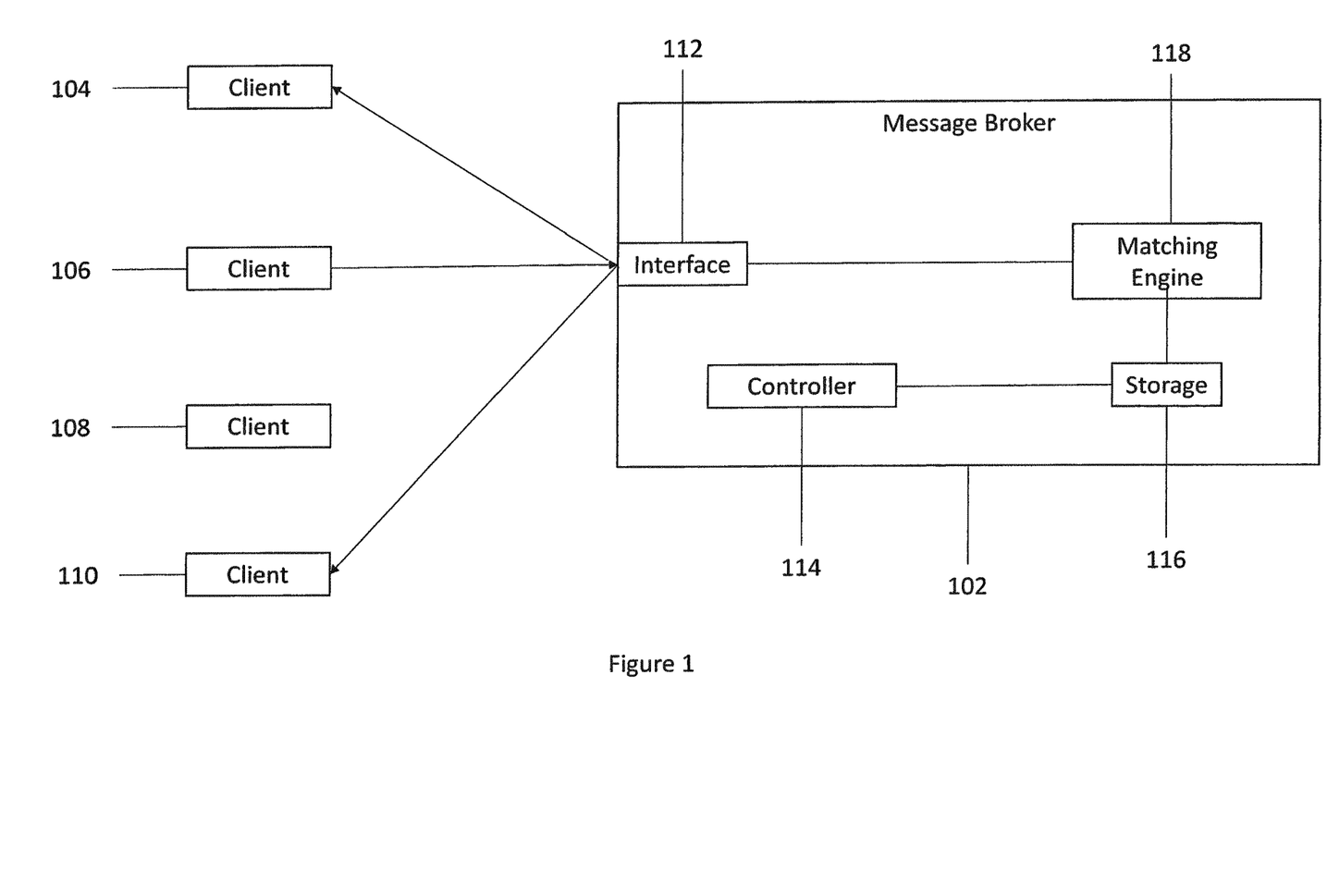
FIG. 1 shows schematically an example of a publish-subscribe communication system.

FIG. 1 illustrates a publish/subscribe communication system. A message broker 102 has an interface 112, which it uses to communicate with a plurality of client devices 104, 106, 108, 110. The message broker 102 may be, for example, a server. The interface 112 may comprise a transceiver apparatus configured to receive signals from the client devices over a wired and/or a radio interface and to transmit signals to the client devices over the wired and/or radio interface. For a wireless connection, the transceiver apparatus may comprise, for example by a radio part and associated antenna arrangement. The antenna arrangement may be arranged internally or externally to the message broker.

The interface 112 may comprise an input mechanism, which may be, for example, an input queue or a synchronous input node by which messages are input when they are sent by a client device to the message broker. A published message is fetched from the input mechanism by a controller 114 and processed to determine, amongst other things, to which client devices the message should be sent. There may be more than one interface to and from which messages are sent and received by the message broker 102.

The class indicated by a received message provides the key to the delivery of messages (publications) between publishers and subscribers. The broker is configured to match a class string on a published message with a list of clients who have subscribed to receive messages including that class string. A list of clients for each message class may be held in storage 116. A matching engine 118 may be provided in the message broker for the purpose of matching the class string to clients. When a client device registers as a subscriber, it may specify a means by which it wants to receive messages (which may be a queue or other input mechanism) and an indication of the class of messages that it is interested in receiving.

In one example, a client device may transmit a subscription request message specifying that it wishes to receive messages including a class string, such as "temperature", "pressure", "humidity", "luminous intensity", etc. The message broker may receive such a message at the interface, and process it at the controller to determine that the list of client devices registered for the class string "temperature" should be updated in the storage 116. The controller is configured to write to the storage 116 to update the list of client devices registered for that class string.

Suppose that the clients 104, 110 are then subscribed to receive messages of the class "temperature" or Client 106, the publisher in this case, transmits a message of the class "temperature" to the message broker, which it receives at the interface. The matching engine 118 matches the class "temperature" to list of clients registered as subscribers for this class, and therefore, determines that the client devices 104, 110 are registered as subscribers. The controller may then process the message to program it, e.g. by inserting appropriate headers, to be forwarded to client devices 104, 110. The interface then transmits a copy of the message to the client devices 104, 110. It will be appreciated by the person skilled in the art, that although client device 106 has been presented as a publisher, it may also act as a subscriber for messages of one or more classes. Furthermore, it will be appreciated that, although client devices 104, 110 have been presented as being subscribers, they may also acts as publishers for messages of one or more classes.

Figure 2:
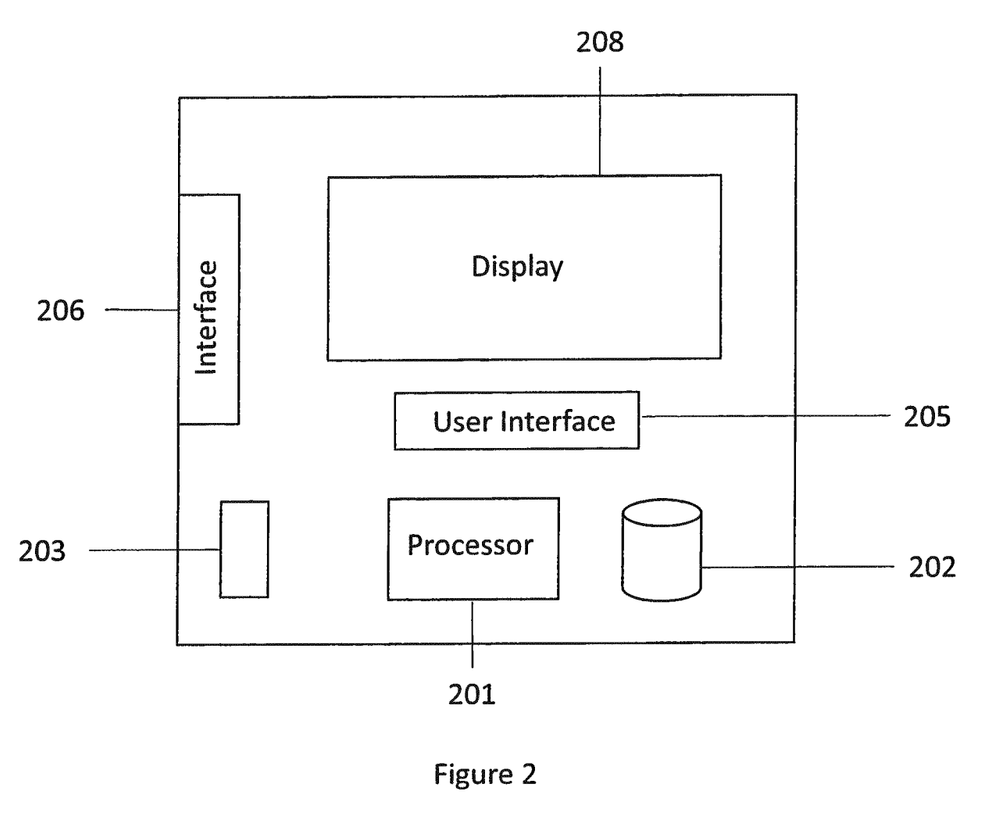
FIG. 2 shows schematically an example of a communication device.

An example client device will now be described in more detail with reference to FIG. 2 showing a schematic, partially sectioned view of a wireless communication device 200.

A client device 200 may be for example a mobile device, that is, a device not fixed to a particular location, or it may be a stationary device. The wireless device may need human interaction for communication, or may not need human interaction for communication, for example being a MTC device.

The client device 200 may receive signals over an air or radio interface 207 via appropriate apparatus for receiving and may transmit signals via appropriate apparatus for transmitting radio signals. In FIG. 2 an interface, which may comprise transceiver apparatus, is designated schematically by block 206. The transceiver apparatus may be provided for example by means of a radio part and associated antenna arrangement. The antenna arrangement may be arranged internally or externally to the wireless device. In some example, the interface may be a wired interface, which may send and receive data over a metal wire or optical fibre.

A client device 200 is typically provided with at least one data processing entity 201, at least one memory 202 and other possible components 203. The other components 203 may include sensors, such as temperature sensors, pressure sensors, light intensity sensors, etc., to make measurements for the client device 200. The other components 203 may also include actuators, which the client device 200 may use to carry out real world tasks. The data processing, storage and other relevant control apparatus can be provided on an appropriate circuit board and/or in chipsets. A user may control the operation of the client device by means of a suitable user interface such as key pad 205, voice commands, touch sensitive screen or pad, combinations thereof or the like. A display 208, and a speaker can be also provided. Furthermore, a wireless communication device may comprise appropriate connectors (either wired or wireless) to other devices and/or for connecting external accessories, for example hands-free equipment, thereto.

The client 200 may be configured to communicate with a message broker according to the MQTT protocol. The interface 206 may be configured for communications according to this protocol. Although the client device example given here has primarily been presented as a wireless communication device, it should be appreciated that in other examples the client devices may use other means, such as metal wires or optical fibres to communicate with the message broker.

Referring back to FIG. 1, a problem may occur when a client device, such as client device 108, ungracefully disconnects from the message broker. To explain this, a graceful disconnection may be one in which the client transmits a disconnect message to the message broker prior to disconnecting. On the other hand, an ungraceful disconnect may occur when a disconnect is not deliberately initiated by the message broker or the client, and for example no disconnect message is sent prior to the disconnection. An ungraceful disconnect may instead occur due to a network connection being lost, e.g. because the battery of the client device ran out of power or for some other reasons. In this case, the message broker may continue to receive messages of a class to which the client device 108 was subscribed. The message broker must make a decision as to what to do with messages that are indicated for transmission to the client device 108. The message broker could simply drop these messages. However, this may be undesirable due to these messages going unprocessed by a client device.

One proposal has been for the situation when a client device has disconnected from the message broker, to store any message in the message broker that would have been transmitted to the client device. When the client device reconnects to the message broker, the message broker sends the stored messages to the client device. However, in this case, the stored messages go unprocessed until the client device reconnects. Furthermore, the storage of the messages in the message broker requires additional storage space.

Another proposal has been to notify other clients about an ungracefully disconnected client by publishing to a client specific class/topic. This is a precaution for unexpected cases. However, this proposal does not address the problem of how to process messages intended for transmission to the ungracefully disconnected client. A message indicating that a client has disconnected could be declared on a specification message class. But other clients would not have permission to access that topic or were not aware about that.

Therefore, there is a problem that occurs when a client in a publish-subscribe messaging system disconnects from a messaging broker, especially in the case that a client has ungracefully disconnected from the messaging broker.

In an example described herein, there is provided a method of distributing the publish-subscribe messages in which, when a first client device disconnects from the message broker, the message broker is configured to transmit messages that are indicated as being for transmission to the first client device to a second client device which has been nominated as the successor for the first client device. The first client device may nominate the second client device as a successor by publishing a specific message (as is explained below) to the message broker. This declaration may in general be made on any phase of an MQTT connection. The second client device, which has been nominated as a successor to the first client device, may then receive these messages from the message broker and process them. Therefore, the messages that were intended for the first client device may be received and processed by a second client device, even before the first client device has reconnected to the message broker. Therefore, it is not necessary to store messages at the message broker until the client device reconnects since examples provide for this message inheritance or bequeathing to route or reassign a disconnected client's messages to another client. The client devices are able to re-organize the message flow between themselves autonomously on ungraceful disconnection cases. This defined inheritance or bequeathing mechanism will for example help the system to not drop any emergency data packets even if a disconnection to a client device occurs.

Figure 3:
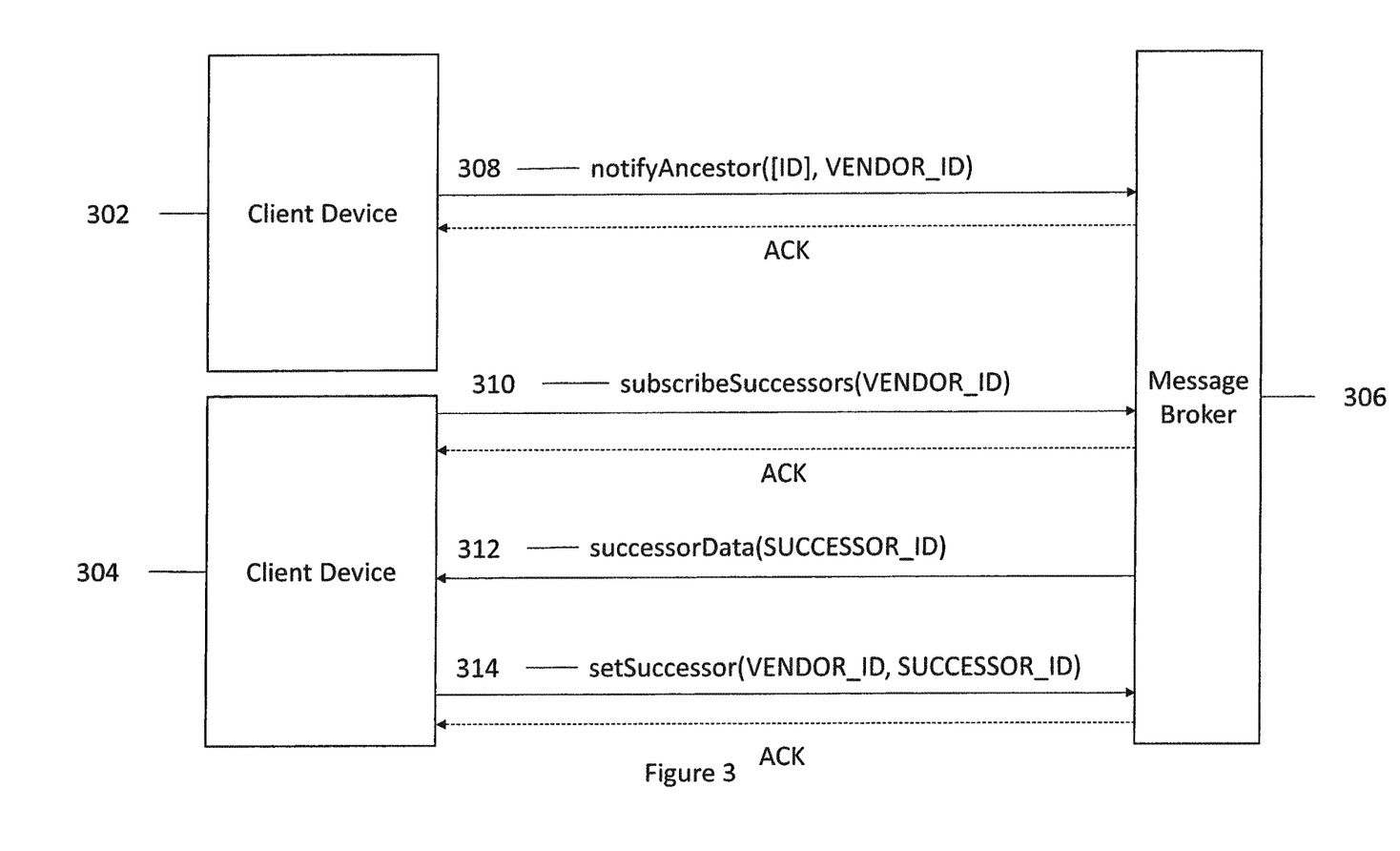
FIG. 3 shows schematically an example of publish-subscribe communication system.

An example of a process of establishing a successor for a first client device will, now be explained with reference to FIG. 3. FIG. 3 illustrates the messages exchanged between a first client device 304 and the message broker 306, and a second client device 302 and the message broker 306, during a process of establishing the second client device 302 as a successor to the first client device 304 so that the second client device 302 can receive messages intended for the first client device 304 if the first client device 304 disconnects from the message broker 306. It will be appreciated that not all of these messages are essential and that some examples may omit one or more of these messages. The client devices illustrated in this figure and discussed in this present disclosure may be referred to as nodes. The message broker 306 may be a server. The message broker 306 may comprise or be distributed across a plurality of apparatus. For example, the functionality of the message broker may be distributed across a plurality of servers.

The second client device 302 is configured to send a message 308 to the message broker indicating the availability of the second client device 302 for receiving messages identified for transmission to other clients. In other words, the message 308 indicates the availability of the second client device 302 as a potential successor to other client devices which the message broker 306 serves. The term "successor" is applied to the second client 302 to mean that the second client 302 is indicated in the message broker 306 as being assigned to receive one or more messages that are indicated for transmission to the first client 304 in the event that the first client 304 has disconnected from the message broker 306. In some cases, the messages may only be routed to the second client 302 if the first client 304 has ungracefully disconnected. The first client device 304 may be referred to as an ancestor/inheritor client, since its messages are routed to its successor in the event that it disconnects.

The message 308 may be referred to as a notifyAncestor message 308. The message 308 may include the ID of the second client device 302 so that the message broker 306 is able to determine the identity of the second client device 302 that has indicated its availability as a successor. The message 308 may also include an ID of a vendor of the second client device 302. The message broker may store this vendor ID and use it to help other client devices select an appropriate successor device as will be explained below. Since most of the vendors may use the same MQTT broker on cloud system, calling VENDOR_ID will be beneficial for distinguishing the ancestors and successors. After receiving the message 308, the message broker 306 may store an indication that the second client device 302 is available as a successor. The message broker 306 may be configured to send an acknowledgment message (ACK) to the second client device 302 in response to receiving the message 308.

The first client device 304 is configured to send a message 310 to the message broker 306 that polls the message broker 306 to obtain a successor client for the first client device 302. This polling message may be sent on a special topic/class. The message 310 may be referred to as a subscribeSuccessors message. The message 310 may comprise an ID of a vendor of the first client device 304. The message broker 306 is configured to receive the message 310 and determine one or more potential successors for the first client device 304. A potential successor for the first client 304 is one that is available for receiving one or more messages intended for the transmission to the first client 304 in the event that the first client ungracefully disconnects from the message broker 306. The message broker 306 may only determine that a client device is a potential successor if that client device has indicated its availability as a potential successor. In this example, the second client 302 may be included in the one or more potential successors since it sent the message 308 indicating its availability as a successor. The message broker 306 may be configured to send an acknowledgment message (ACK) to the first client device 304 in response to receiving the message 310.

The message broker 306 may determine an appropriate successor for the first client device 304 by matching the vendor ID of the first client device 304 against the vendor IDs of other clients to determine a match. In some examples, a client may only serve as a successor to another client, if the clients possess the same vendor ID. It may be desirable to do this so as to ensure that a successor is not from a different manufacturer from the first client device 304, since different manufacturers may have different message handling implementations. The message broker 306 may, therefore, determine one or more potential successor clients for the first client device 304 in dependence on a match being found between the vendor ID of the first client device 304 and the vendor IDs of one or more of the successors. In this example, the first client 304 and the second client 302 may have the same vendor ID such that the second client 302 is determined to be a potential successor to the first client 304.

When the message broker has determined one or more potential successors for the first client, the message broker is configured to transmit a message 312 to the first client comprising an indication of the one or more potential successors. This message 312 may be referred to as a successorData message. The message 312 may comprise an ID of each of the one or more potential successors. The ID of each of the one or more potential successors may comprise a MAC address of each of the one or more potential successors.

The first client device 304 may then select a successor from the one or more potential successors indicated to it by the message broker 306. The first client 304 may, for example, select the second client 302 as a successor. The first client 304 may then send a message 314 to the message broker 306, indicating a client device that is to be set as the successor for the first client device 304. This message may be declared on the connection phase. The message 314 may be a setSuccessor message. In response, to receiving the message 314, the message broker 306 may be configured to send an acknowledgment message (ACK) to the first client device 304. The message 314 may include an ID of the vendor of the second client device 314 and ID of the second client device 314. The message broker 306 receives the message 314 and stores an indication that the second client device 302 is the successor to the first client device 304. Then, when the first client device 304 disconnects from the message broker 306, the message broker 306 may transmit one or more messages intended for transmission to the first client 304 to the second client 302. The second client 302 may receive these one or more messages and process them in place of the first client 304.

Because of the broker-oriented message distribution nature of the MQTT protocol, it is not required to send the successor Set message to all other clients. There may, for example, be data acquisition just between the ancestors and successors. Instead of broadcasting the received successor Set message to all other nodes, the message broker will have a database for ancestors and successors to determine whether to route the incoming messages to the ancestor client (i.e. the first client in this example) or to the successor client (i.e. the second client in this example).

Figure 4:
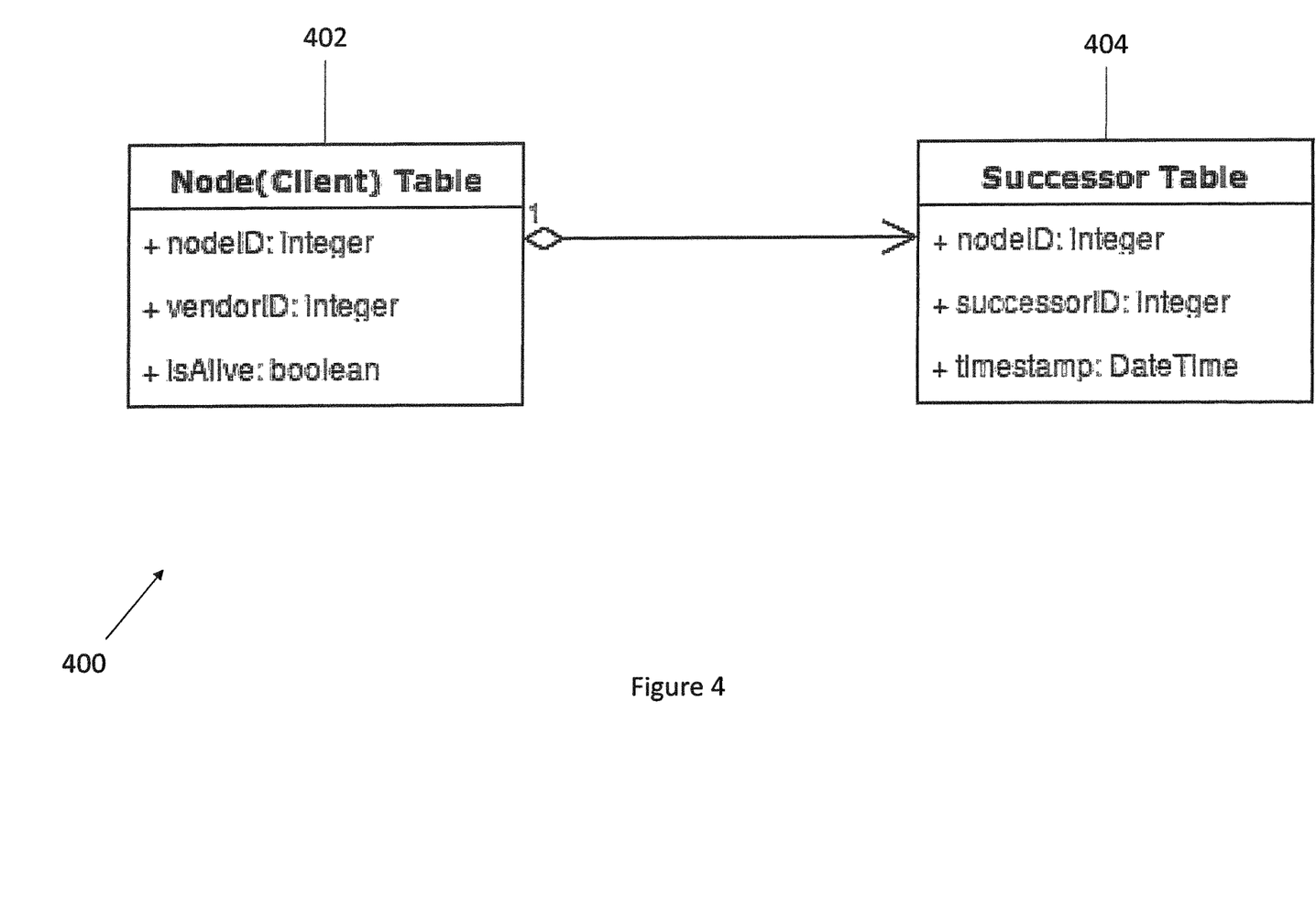
FIG. 4 shows an example of client related data stored in a message broker.

Reference is made to FIG. 4, which shows an example of data 400 that may be stored in the message broker 306. A first data structure 402 comprises one or more fields comprising information about the first client 304. A second data structure 404 comprises one or more fields comprising information about the second client 302, which has been selected as a successor to the first client 304. The first data structure 402 comprises an ID (shown as nodeID in the figure) of the first client 304, which allows it to be uniquely identified from amongst the client devices with which the message broker communicates. This ID may be a MAC address of the first client device 304. The first data structure 402 may also comprise a vendor ID (shown as vendorID in the figure). This identifies the manufacturer of the first client 304. The first data structure 402 may comprise an indication (shown as IsAlive in the figure) as to whether or not the first client 304 is connected or disconnected from the message broker 306. The message broker 306 may use this indication to determine whether to send messages that have been indicated for transmission to the first client 304 to the first client 304 (if the indication shows that the first client is connected to the message broker) or to the successor, i.e. second client 302 (if the indication shows that the second client is disconnected to the message broker). When the first client device 304 ungracefully disconnects from the message broker, the message broker 306 is configured to, in response to detecting that the first client device 304 has ungracefully disconnected, set this field to indicate that the first client 304 has ungracefully disconnected, e.g. by setting the IsAlive field to false.

The first data structure 402 may be linked to the second data structure 404. The two data structures may linked by a "foreign key". The second data structure 404 may include an ID (shown as nodeID in the figure) of the first client 304. This nodeID attribute may be linked by a foreign key to the first data structure 402 to easily query the given nodeID between the two data structures. The second data structure 404 may include an ID (shown as a successorID in the figure) of the second client. This ID uniquely identifies the second client 304.

Figure 5:
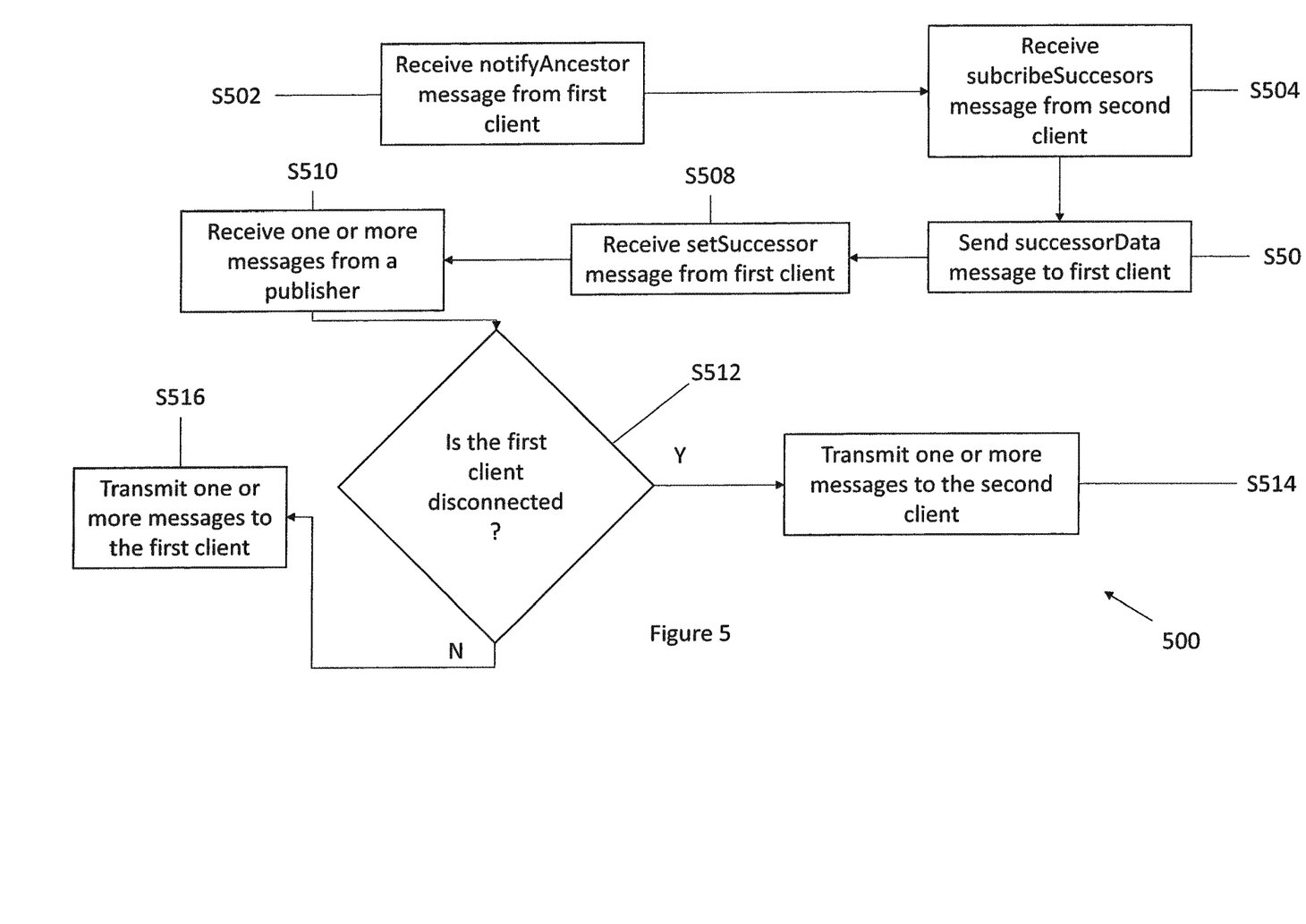
FIG. 5 shows an example method performed at a message broker in accordance with examples of the present disclosure.

Reference is made to FIG. 5, which shows an example of a method that may be performed in a message broker. It will be appreciated by the skilled person that not all of the steps in this method are essential and that in some examples one or more of the steps may be omitted.

At S502, the message broker 306 receives a message from the second client 302 indicating the availability of the second client 302 for receiving messages identified for transmission to other clients.

At S504, the message broker receives from the first client 304 a message requesting an indication of the availability of one or more clients for receiving the one or more messages indicated for transmission to the first client 304.

At S506, the message broker 306 sends to the first client 304 an indication of the availability of the second client 302 for receiving the one or more messages intended for transmission to the first client 304.

At S508, the message broker 306 receives from the first client 304 identifying a second client 302 as a successor of the first client 304. In response to receiving this message, the message broker 306 stores and indication that the second client 302 is successor to the first client 304.

At S510, the message broker receives one or more messages from a third client device which is acting as a publisher. These messages are indicated for transmission to the first client 304. The messages may belong to a particular class, and the indication that the messages are for transmission to the first client 304 may comprise an indication that the messages are subscribed to a class that first client 304 is subscribed to. The message broker 306 may determine that the one or more messages are for transmission to the first client 304, by determining that the first client 304 is subscribed to the class to which the one or more messages belong.

At S512, the message broker 306 determines whether the first client 304 is disconnected from the message broker 306. This may comprises determining whether the first client 304 has ungracefully disconnected from the message broker 306. The message broker 306 may determine that the first client 304 has ungracefully disconnected from the message broker 306 in response to detecting detects problems with the connection or on an unusual disconnection.

At S514, the message broker 306 may transmit the one or more messages to the second client 302 if it is determined that the first client 304 has disconnected from the message broker 306.

At S516, the message broker 306 transmits the one or more messages to the first client 304 if it is determined that the first client 304 is connected to the message broker 306.

Figure 6:
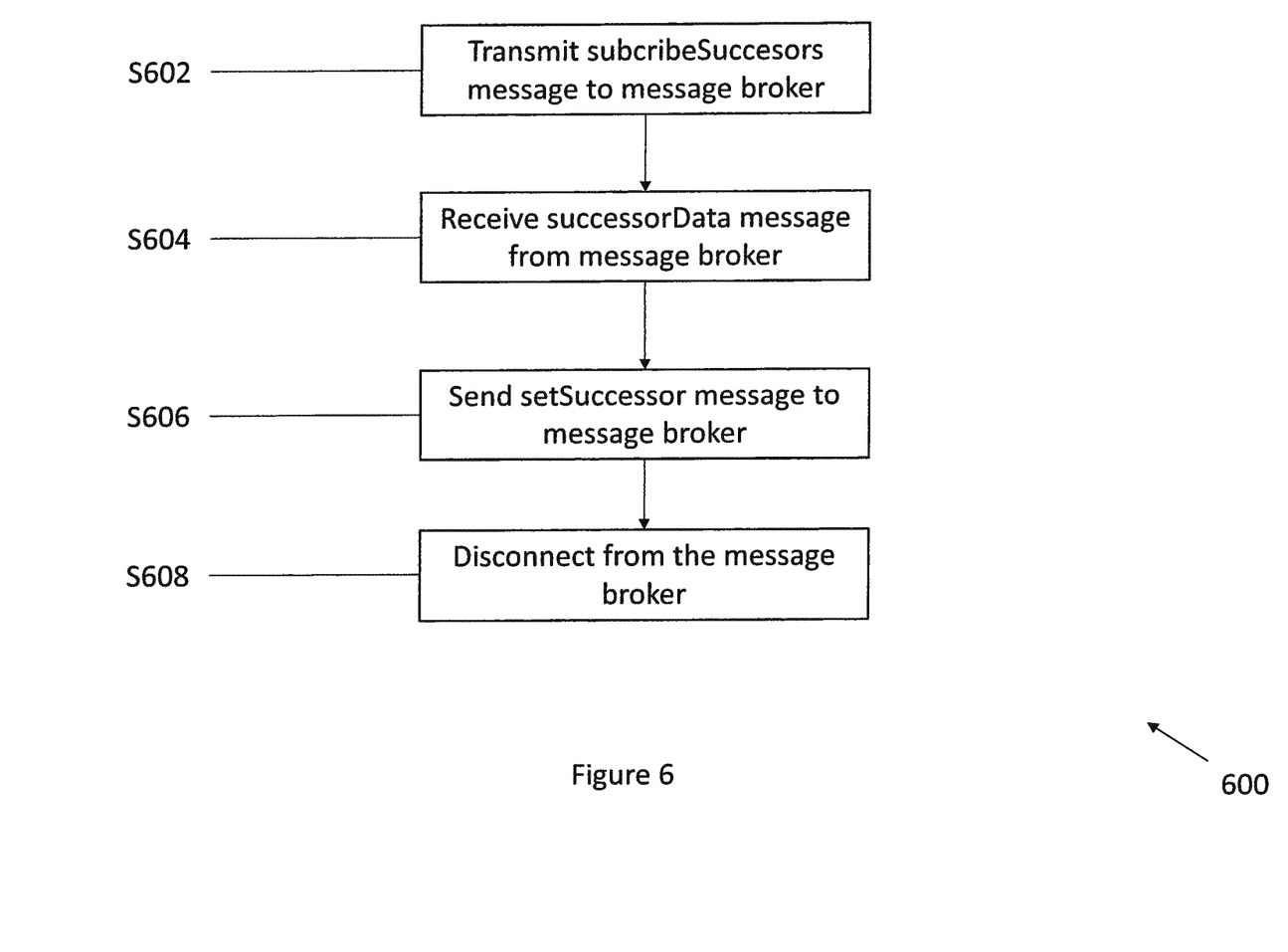
FIG. 6 shows an example method performed at a first client in accordance with examples of the present disclosure.

Reference is made to FIG. 6, which shows an example of a method 600 that may be performed at the first client 304. It will be appreciated by the skilled person that not all of the steps in this method are essential and that in some examples one or more of the steps may be omitted.

At S602, the first client 304 sends to the message broker 306 a message requesting an indication of the availability of one or more clients for receiving the one or more messages intended for transmission to the first client 304.

At S604, the first client 304 receives from the message broker 306 an indication of the availability of one or more clients for receiving the one or more messages intended for transmission to the first client 304. The one or more clients, in this example, includes the second client 302.

At S606, the first client 304 sends to the message broker 306 a message identifying a second client 302 as a successor of the first client 304. The first client 304 will select the second client 302 as the successor from the one or more available clients prior to sending this message. This message may be an instruction to the message broker 306 to, in the case that the first client 304 disconnects from the message broker 306, route one or more messages indicated for delivery to the first client 304 to the second client 302.

At S608, the first client 304 disconnects from the message broker 306. This disconnect may be an ungraceful disconnect.

Figure 7:
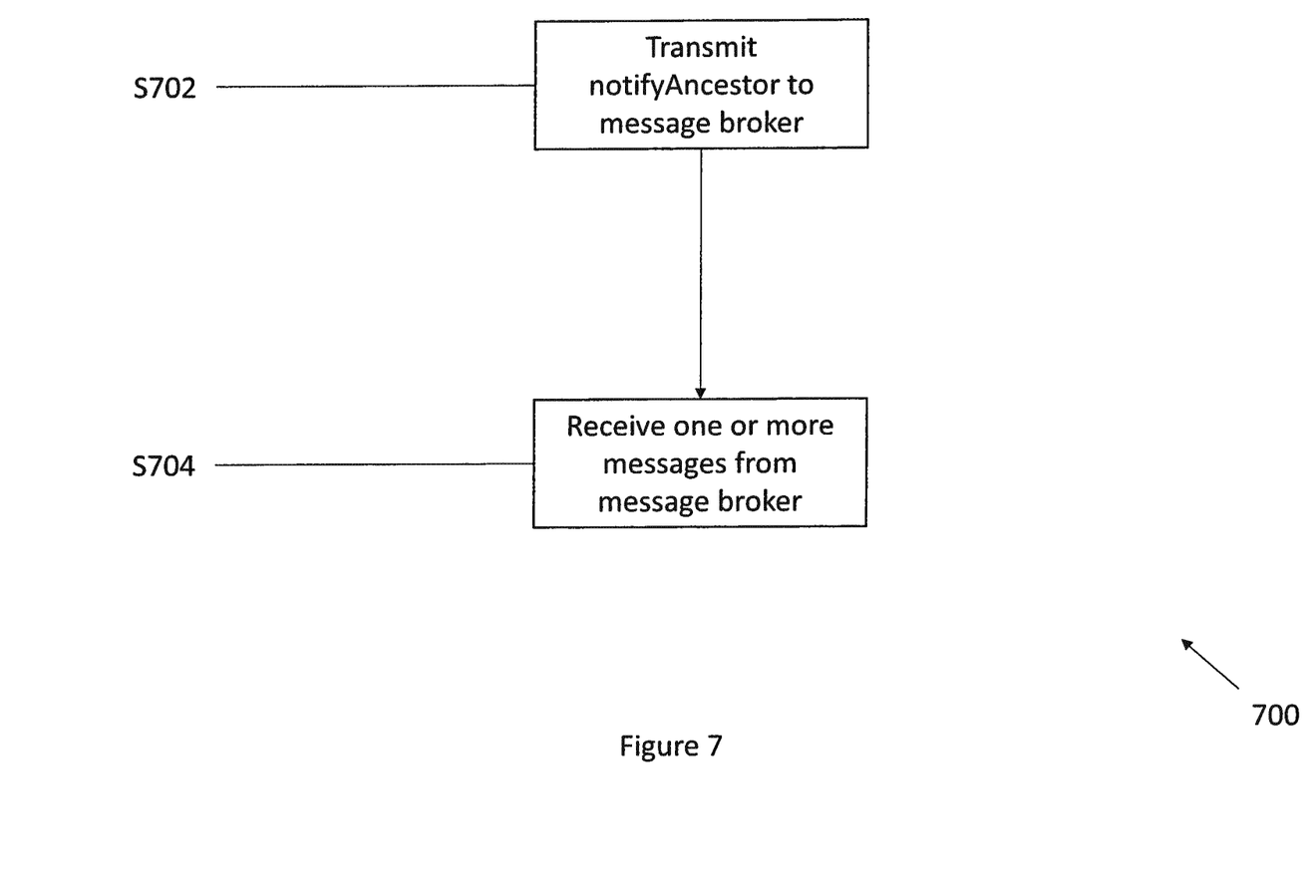
FIG. 7 shows an example method performed at a second client in accordance with examples of the present disclosure.

Reference is made to FIG. 7, which shows a method which may be performed at a successor client, in this example the second client 302. It will be appreciated by the skilled person that not all of the steps in this method are essential and that in some examples one or more of the steps may be omitted.

At S702, the second client 302 is configured to transmit a message to the message 306 broker indicating the availability of the second client 302 for receiving messages identified for transmission to other clients.

At S704, the second client 302 is configured to receive one or more messages from the message broker 306 that were indicated for transmission to the first client 304. The second client 302 may process these messages in place of the first client 304.

Figure 8:
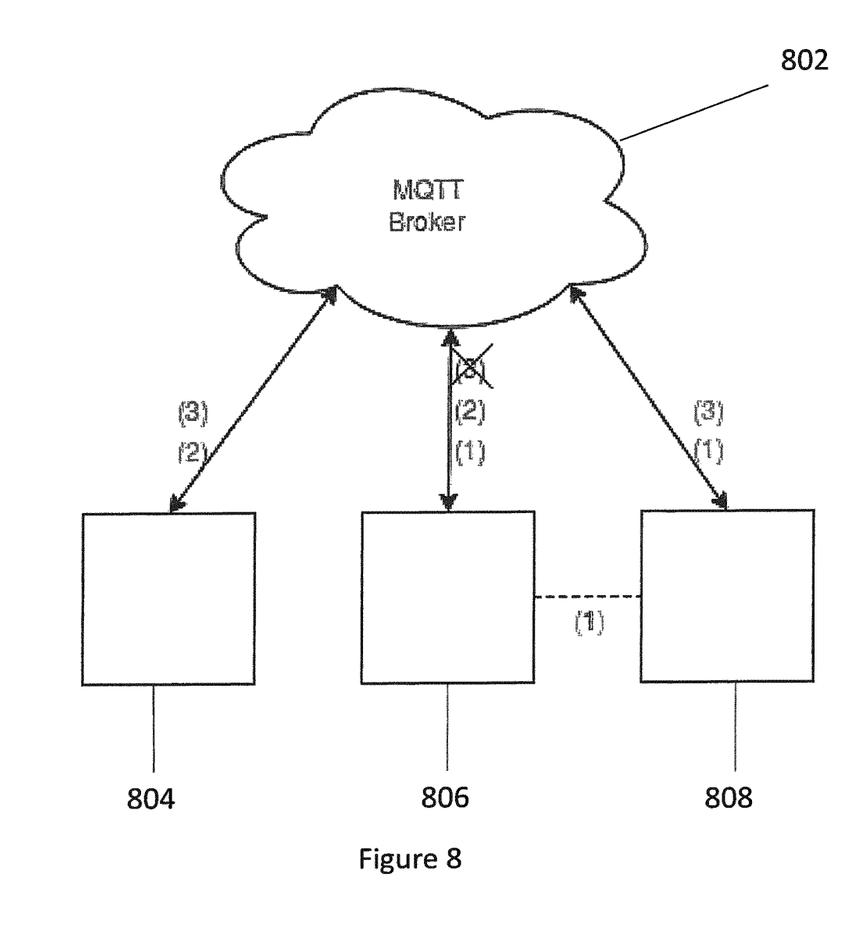
FIG. 8 shows schematically an example of a publish-subscribe communication system.

Reference is made to FIG. 8, which shows schematically a publish-subscribe communication system. This figure also shows a third client 804 configured to act as a publisher for sending messages to other clients. A first Client 806 may be the same and perform any of the functions as the first client 304 described above with respect to FIG. 3. A second client 808 may be the same and perform any of the functions as the second client 302 described above with respect to FIG. 3. A message broker 802 may be the same and perform any of the functions as the message broker 306 described above with respect to FIG. 3. In this example, the first client 806 has subscribed to the messages of a class sent by the third client 804.

The messages represented by number (1) shown in the figure represent the notify/subscribe messages (e.g. notify-Ancestor, subscribeSuccessors, successorData, setSuccessor), that are sent from the first client 806 and second client 808 for establishing the second client 808 as successor to the first client 806. In the case in which the first client 806 is connected to the message broker 802, the third client 804 sends one or more messages (represented by message (2) in the figure) to the first client 806 via the broker 802. However, if the first client 806 loses its connection to the message broker 802, the next one or more messages (represented by message (3) in the figure) that are indicated (by the their indicated class/topic) for transmission to the first client 806 will be transferred/routed to the second client 808 by the broker 802 in response to the successor declaration. This usage scenario helps the third client 804 to not waste its messages so that they are somehow delivered to a client which would be related with the second client so that they may be processed or so that other nodes may be notified.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors and a digital signal processor or processors, which are configurable so as to operate in accordance with the exemplary examples. In this regard, the exemplary examples may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Although, in the description, reference has been made to the Message Queue Telemetry Transport protocol, it will be understood by the skilled person that this is an example only and that some examples of the present disclosure may involve the use of other protocols.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method for distributing publish-subscribe messages to clients over a network using a message broker, the method comprising:
   the message broker receiving a message from a first client which identifies a second client as a successor of the first client;
   determining that the first client has disconnected from the message broker; and
   in response to determining that the first client has disconnected from the message broker, the message broker routing to the second client one or more messages that are identified for transmission to the first client.

2. A method as claimed in claim 1, wherein the determining that the first client has disconnected from the message broker comprises determining that the first client has ungracefully disconnected from the message broker.

3. A method as claimed in claim 1, wherein the one or more messages are Message Queue Telemetry Transport messages.

4. A method as claimed in claim 1, comprising prior to receiving the message from the first client identifying the second client:
   receiving a message from the second client indicating the availability of the second client for receiving messages identified for transmission to other clients; and
   sending to the first client an indication of the availability of the second client for receiving the one or more messages intended for transmission to the first client.

5. A method as claimed in claim 4, wherein the message from the second client comprises a vendor ID for the second client, and the sending to the first client the indication of the availability of the second client is performed in response to determining that the vendor ID of the second client matches a vendor ID of the first client.

6. A method as claimed in claim 4, comprising:
   sending to the first client the indication of the availability of the second client in response to receiving a polling message from the first client to poll one or more clients to determine their availability for receiving the one or more messages intended for transmission to the first client.

7. A method as claimed in claim 1, wherein the one or more messages are identified as being for transmission to the first client by an indication of a subscription by the first client to a class of the one or more messages, wherein the indication is stored by the message broker.

8. A method as claimed in claim 1, wherein the message from a first client identifying a second client comprises a media access control address of the second client.

9. A computing device configured to perform the steps of claim 1 when a computer program comprising instructions is executed on the computing device, the computing device comprising the message broker, and the message broker comprising at least one processor and at least one memory including code for the computer program.

10. A method for controlling the distribution of publish-subscribe messages to clients, the method comprising:
    a first client sending a message to a message broker identifying a second client as a successor to the first client, the message comprising an instruction to the message broker to route to the second client one or more messages identified for transmission to the first client in response to the message broker determining that the first client has disconnected from the message broker.

11. A computing device configured to perform the steps of claim 10 when a computer program comprising instructions is executed on the computing device, the computing device comprising the message broker, and the message broker comprising at least one processor and at least one memory including code for the computer program.

12. A message broker configured to distribute publish-subscribe messages to clients, the message broker comprising at least one processor and at least one memory including computer program code, the at least one memory and the computer program code configured to, with the at least one processor, cause the message broker at least to:
   determine that a first client of the message broker has disconnected from the message broker; and
   in response to determining that the first client has disconnected from the message broker, route to a second client one or more messages that are identified for transmission to the first client, the second client having been identified in a message from the first client which identified the second client as a successor to the first client.

13. A first client device configured to control the distribution of publish-subscribe messages to clients, the first device comprising at least one processor and at least one memory including computer program code, the at least one memory and the computer program code configured to, with the at least one processor, cause the first client device at least to:
   send a message to a message broker identifying a second client as a successor to the first client, the message comprising an instruction to the message broker to route to the second client one or more messages identified for transmission to the first client in response to the message broker determining that the first client has disconnected from the message broker.

\* \* \* \* \*